US008451561B2

(12) United States Patent
Yano

(10) Patent No.: US 8,451,561 B2
(45) Date of Patent: May 28, 2013

(54) SERVO WRITE HEAD, SERVO WRITER, AND METHOD FOR MANUFACTURING MAGNETIC TAPE WITH SERVO SIGNAL WRITTEN THEREON

(75) Inventor: Takafumi Yano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 203 days.

(21) Appl. No.: 12/986,826

(22) Filed: Jan. 7, 2011

(65) Prior Publication Data

US 2011/0181982 A1 Jul. 28, 2011

(30) Foreign Application Priority Data

Jan. 22, 2010 (JP) ................................. 2010-012383
Oct. 8, 2010 (JP) ................................. 2010-228104

(51) Int. Cl.
*G11B 5/187* (2006.01)

(52) U.S. Cl.
USPC ........................................................ 360/122

(58) Field of Classification Search
USPC .................................................. 360/122, 121
See application file for complete search history.

(56) References Cited

U.S. PATENT DOCUMENTS

| | | | | |
|---|---|---|---|---|
| 4,123,791 A * | 10/1978 | Rotter et al. | ............. | 360/130.21 |
| 5,602,703 A * | 2/1997 | Moore et al. | ................... | 360/121 |
| 5,978,185 A * | 11/1999 | Abe et al. | ....................... | 360/122 |
| 6,118,626 A * | 9/2000 | Muftu et al. | ................... | 360/122 |
| 6,236,537 B1 | 5/2001 | Poorman et al. | | |
| 6,282,055 B1 * | 8/2001 | Lakshmikumaran et al. | | 360/122 |
| 6,373,656 B2 * | 4/2002 | Poorman et al. | ............... | 360/122 |
| 6,700,743 B2 * | 3/2004 | Fahimi et al. | .................. | 360/137 |
| 6,937,435 B2 * | 8/2005 | Saliba | ............................ | 360/122 |
| 6,989,960 B2 * | 1/2006 | Dugas | ............................ | 360/121 |
| 7,023,650 B2 * | 4/2006 | Basra et al. | ................. | 360/77.12 |
| 7,199,958 B2 * | 4/2007 | Weber et al. | ..................... | 360/48 |
| 7,206,167 B2 * | 4/2007 | Beck et al. | ..................... | 360/122 |
| 7,215,510 B2 * | 5/2007 | Kuroda | ......................... | 360/122 |
| 7,486,479 B2 * | 2/2009 | Nakao et al. | ............. | 360/130.21 |
| 7,535,665 B2 | 5/2009 | Tsutsui | | |
| 7,570,457 B2 * | 8/2009 | Biskeborn | ..................... | 360/122 |
| 7,623,310 B2 | 11/2009 | Nakao | | |
| 7,646,565 B2 * | 1/2010 | Biskeborn et al. | ............ | 360/129 |
| 8,009,386 B2 * | 8/2011 | Hachisuka | ..................... | 360/122 |
| 8,054,579 B2 * | 11/2011 | Biskeborn | ..................... | 360/122 |
| 8,254,058 B2 * | 8/2012 | Biskeborn | ..................... | 360/122 |
| 2002/0057524 A1 * | 5/2002 | Beck et al. | ..................... | 360/122 |
| 2003/0093894 A1 * | 5/2003 | Dugas et al. | ............... | 29/603.15 |

(Continued)

FOREIGN PATENT DOCUMENTS

| | | |
|---|---|---|
| JP | 2-132611 A | 5/1990 |
| JP | 9-237403 A | 9/1997 |
| JP | 2000-339619 A | 12/2000 |
| JP | 2004-342303 A | 12/2004 |
| JP | 2005-327386 A | 11/2005 |
| JP | 2007-207365 A | 8/2007 |

*Primary Examiner* — Brian Miller
(74) *Attorney, Agent, or Firm* — Sughrue Mion, PLLC

(57) ABSTRACT

A servo write head for writing a servo pattern on a magnetic tape is provided. A flat magnetic pattern writing surface has a magnetic gap contoured to correspond to the servo pattern, and is disposed to allow the magnetic tape to slidably contact therewith. Sloped surfaces are disposed upstream and downstream of the magnetic pattern writing surface in a magnetic tape transport direction at positions retreated from a position of the magnetic pattern writing surface. The sloped surfaces extend obliquely relative to the magnetic pattern writing surface. Connecting surfaces curved gently to smoothly connect the sloped surfaces to the magnetic pattern writing surface are disposed between the magnetic pattern writing surface and each of the sloped surfaces.

12 Claims, 2 Drawing Sheets

U.S. PATENT DOCUMENTS

| | | |
|---|---|---|
| 2004/0228029 A1 | 11/2004 | Saliba |
| 2005/0254163 A1 | 11/2005 | Nakao |
| 2006/0152846 A1* | 7/2006 | Tsutsui ............................ 360/95 |
| 2007/0177296 A1 | 8/2007 | Tsutsui |
| 2008/0049358 A1* | 2/2008 | Biskeborn et al. ............ 360/128 |
| 2009/0231757 A1* | 9/2009 | Biskeborn et al. ............ 360/221 |
| 2009/0290260 A1* | 11/2009 | Bandy et al. ................ 360/234.7 |
| 2012/0008234 A1* | 1/2012 | Biskeborn et al. ......... 360/77.12 |

* cited by examiner

SERVO WRITE HEAD, SERVO WRITER, AND METHOD FOR MANUFACTURING MAGNETIC TAPE WITH SERVO SIGNAL WRITTEN THEREON

CROSS-REFERENCE TO RELATED APPLICATION(S)

This application claims the foreign priority benefit under Title 35, United States Code, §119 (a)-(d), of Japanese Patent Application Nos. 2010-012383 and 2010-228104, filed on Jan. 22, 2010 and Oct. 8, 2010, respectively, in the Japan Patent Office, the disclosures of which are herein incorporated by reference in their entirety.

BACKGROUND

1. Field

The present invention relates to a servo write head, a servo writer and a method for manufacturing a magnetic tape with a servo signal written thereon.

2. Description of Related Art

The magnetic tape on which digital data are recordable along its data tracks designed to have as narrow widths as possible to increase its recording density is provided with a servo signal written thereon in advance for use in the tracking control over a magnetic head so that the magnetic head can follow the narrow tracks. The servo signal is written on the magnetic tape by an apparatus called servo writer when the magnetic tape is manufactured in the factory (see U.S. Pat. No. 7,623,310 B1 corresponding to JP 2005-327386 A).

In order to improve the productivity of magnetic tapes, a servo signal writing operation performed by the servo writer may preferably proceed with a magnetic tape transported at as high speeds as possible. On the other hand, such a high-speed transport of the magnetic tape should entrain air which forms a thin layer over the magnetic tape, whereby spacing is generated between a magnetic head (servo write head) for writing a servo signal and the magnetic tape due to the thin layer of entrained air. If the spacing would become too great, the servo write head would become unable to write a servo signal having a sufficient intensity on the magnetic tape.

SUMMARY

The inventor and his colleagues has focused attention on the relation between the spacing and the shape of the servo write head, and discovered that the delicate design in the profile of the servo write head has an influence on the generation of the spacing.

It is one aspect of the present invention to achieve an appropriate state of contact between the magnetic tape and the servo write head without excessive spacing generated between the servo write head and the magnetic tape even during the high-speed transport of the magnetic tape, thereby providing a magnetic tape with a servo signal having a sufficient signal intensity.

More specifically, in an apparatus aspect of the present invention, there is provided a servo write head for writing a servo pattern on a magnetic tape. The servo write head comprises a flat magnetic pattern writing surface, sloped surfaces and connecting surfaces. The flat magnetic pattern writing surface has a magnetic gap contoured to correspond to the servo pattern. The magnetic pattern writing surface is disposed to allow the magnetic tape to slidably contact therewith. The sloped surfaces are disposed upstream and downstream of the magnetic pattern writing surface in a magnetic tape transport direction at positions retreated from a position of the magnetic pattern writing surface, and extend obliquely relative to the magnetic pattern writing surface. The connecting surfaces are disposed between the magnetic pattern writing surface and each of the sloped surfaces. The connecting surfaces are curved gently to smoothly connect the sloped surfaces to the magnetic pattern writing surface. The connecting surfaces may be configured to bulge out toward the magnetic tape to be transported, to smoothly connect the sloped surfaces to the magnetic pattern writing surface.

Preferably but not necessarily, a wrap angle of each of the connecting surfaces for the magnetic tape may be not smaller than 1.16 degree and smaller than 90 degrees.

The sloped surfaces may have at least one groove extending in a direction transverse to the magnetic tape transport direction.

In another apparatus aspect of the present invention, a servo writer is provided which comprises a servo write head as described above, a magnetic tape transport system, and a write signal generator. The magnetic tape transport system is configured to supply a magnetic tape from a supply reel, cause the magnetic tape to slide along the magnetic pattern writing surface of the servo write head, and take up the magnetic tape onto a take-up reel. The write signal generator is configured to output a signal to the servo write head to write a servo signal on the magnetic tape.

In a method aspect of the present invention, there is provided a method for manufacturing a magnetic tape with a servo signal written thereon. The method comprises: transporting a magnetic tape to cause the magnetic tape to slide along the magnetic pattern writing surface of a servo write head as described above; and outputting a signal for writing a servo signal on the magnetic tape to the servo write head, to thereby cause the servo write head to write the servo signal on the magnetic tape.

According to at least one of the apparatus aspects of the present invention, for example, as embodied in the servo write head or the servo writer, excessive spacing will not be generated between the servo write head and the magnetic tape even when the magnetic tape is transported at high speeds. According to at least one of the method aspects of the present invention, for example, as embodied in the method for manufacturing a magnetic tape with a servo signal written thereon, a servo signal is written on a magnetic tape with an appropriate state of contact kept between the magnetic tape and the servo write head, so that a magnetic tape with a servo signal having a sufficient intensity written thereon can be obtained even if the magnetic tape is transported at high speeds when a servo signal is written thereon.

BRIEF DESCRIPTION OF THE DRAWINGS

The above aspects and advantages, other advantages and further features of the present invention will become more apparent by describing in detail illustrative, non-limiting embodiments thereof with reference to the accompanying drawings, in which.

DETAILED DESCRIPTION OF THE EMBODIMENTS

Figure 1:
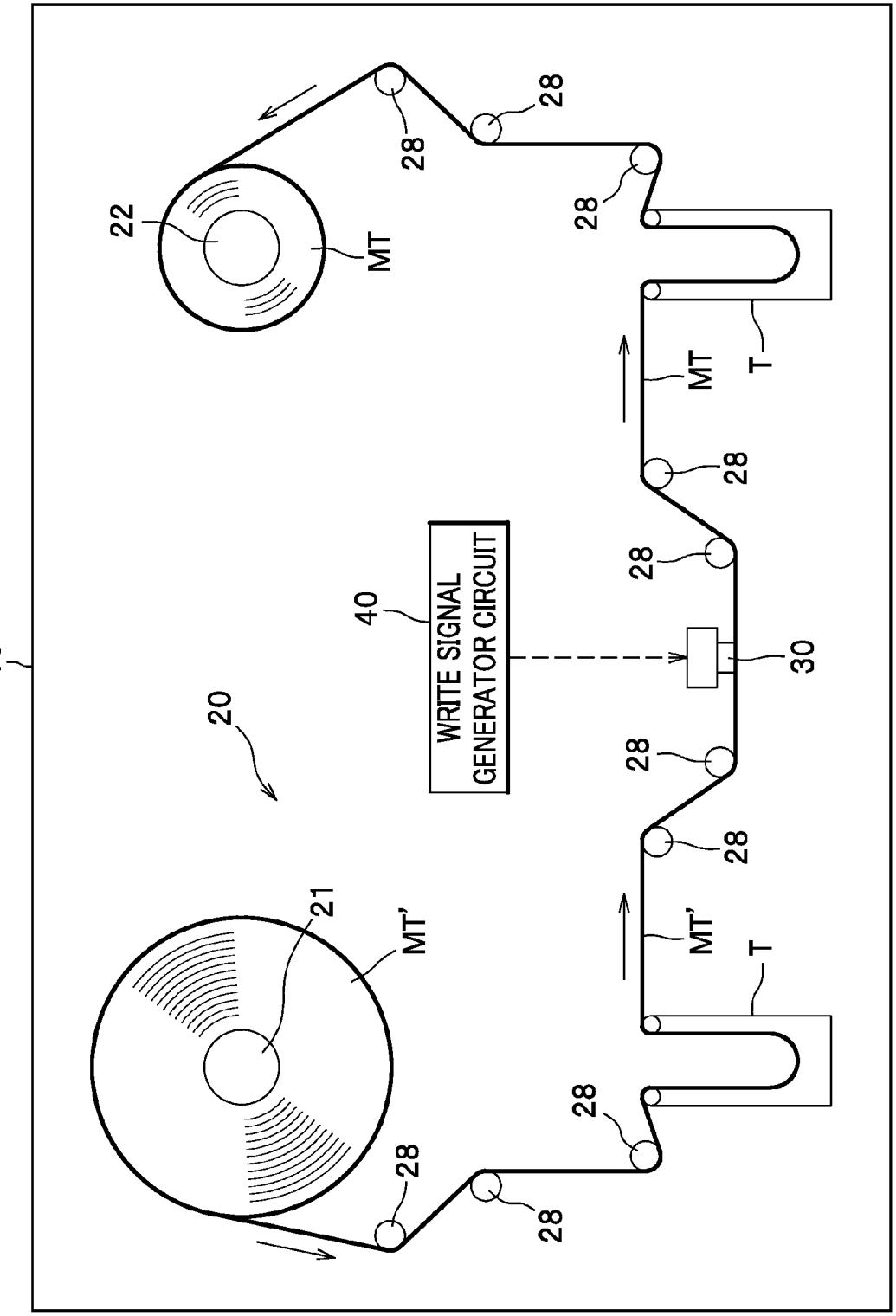
FIG. 1 is a general schematic diagram of a servo writer.

A detailed description will be given of an illustrative embodiment of the present invention with reference to the drawings. As shown in FIG. 1, a servo writer 1 includes a magnetic tape transport system 20 and a servo write head 30 which are arranged appropriately on a base 10. A write signal generator circuit 40 configured to generate a pulse signal for use in writing a servo signal in the servo write head 30 is connected to the servo write head 30. The servo write head 30 receives the pulse signal generated by the write signal generator circuit 40 and writes a servo signal (in this embodiment, the servo signal is not an electric signal but refers to a magnetic pattern arranged with a predetermined pitch in a longitudinal direction of a magnetic tape) on a magnetic tape.

The magnetic tape transport system 20 includes a supply reel 21 around which a magnetic tape MT' which has not yet had a servo signal written thereon is wound, a take-up reel 22 around which a magnetic tape MT which has had a servo signal written thereon is taken up, a plurality of tape guides 28 configured to guide the magnetic tape MT', MT supplied from the supply reel 21 and running across the servo write head 30 to the take-up reel 22 so that the magnetic tape MT', MT is caused to slide along the servo write head 30, and a plurality of tensioners T with which tension of the magnetic tape M', MT being transported can be adjusted and maintained.

Figure 2:
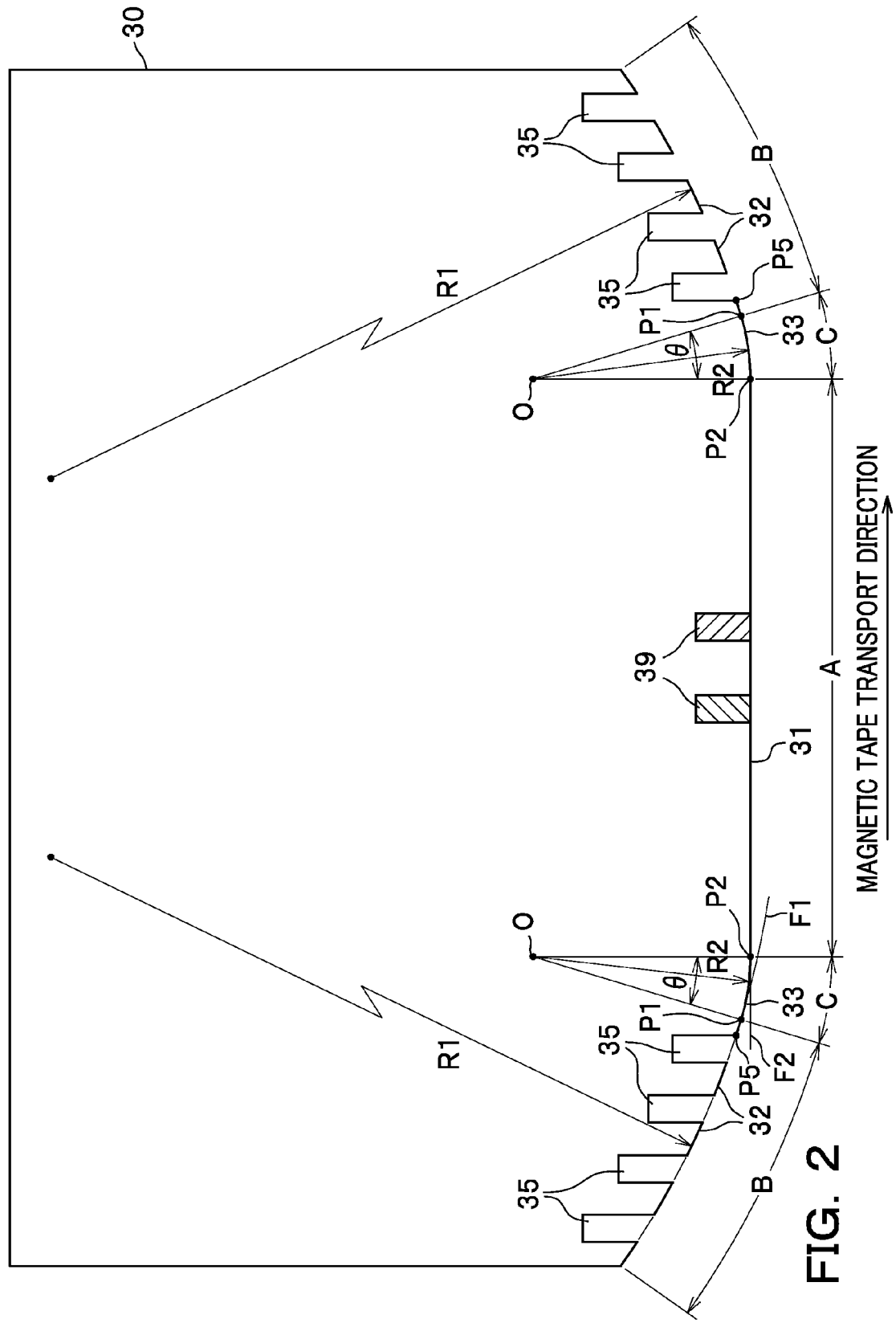
FIG. 2 is an enlarged view of a servo write head.

As shown in FIG. 2, the servo write head 30 is shaped generally like a plate, and includes a flat magnetic pattern writing surface 31 (a region indicated by A) provided at the center on an undersurface thereof. The magnetic pattern writing surface 31 has formed thereon a magnetic gap 39 made of a non-magnetic material and contoured to correspond to a servo pattern. The magnetic pattern writing surface 31 is flat because a magnetic pattern writing surface shaped, for example, like a portion of a circular cylinder (having a segmental shape in cross section) would possibly make the spacing smaller as a whole but disadvantageously increase the friction and thus lower the durability. In contrast, the magnetic pattern writing surface 31 designed to be flat as in the present embodiment can achieve an improved durability, and serve to keep the spacing constant in a wider area so that the writing operation can be performed stably. The servo pattern may be, though not illustrated, for example, a pattern consisting of a set of nonparallel stripes as disclosed in U.S. Pat. No. 7,623,310 B1.

Sloped surfaces 32 (regions indicated by B) are provided upstream and downstream of the magnetic pattern writing surface 31 in a magnetic tape transport direction (from the left to the right in FIG. 2). The sloped surfaces 32 are disposed at positions retreated from a position of the magnetic pattern writing surface 31, and extend obliquely relative to the magnetic pattern writing surface 31 (in a direction away from a plane containing the magnetic pattern writing surface 31). Each of the sloped surfaces 32 is shaped like a portion of a circular cylinder having a radius R1 in this embodiment, though at least one of the sloped surfaces 32 (upstream and/or downstream) may be a flat or non-cylindrically curved surface (as will be described below). Since the sloped surfaces 32 are cylindrically curved, the angle of the sloped surfaces 32 with respect to the magnetic pattern writing surface 31 varies gradually and constantly. In the present embodiment, the sloped surfaces 32 are angled substantially at 5 degrees on the average. In FIG. 2, however, this angle of each sloped surface 32 is shown in such an exaggerated manner that it may appear to be greater than 5 degrees, for purposes of illustration.

Each of the sloped surfaces 32 and connecting surfaces 33 (provided between the magnetic pattern writing surface 31 and the sloped surfaces 32, as will be described later in detail) may not be a curved surface having an unvarying curvature, but may be a surface configured to have a gradually varying curvature. For example, at least one of the sloped surfaces 32 may be curved to trace a cycloid curve as viewed from a side shown in FIG. 2. If each sloped surface 32 is configured to trace a cycloid curve, the region B corresponding thereto is formed with the cycloid curve and the region C (the connecting surface 33 adjacent to the sloped surface 32) connecting the region B and the region A may be formed with a cylindrically curved surface (i.e., a portion of a circular cylinder having a radius R2). Alternatively, the region B and the region C connected to the region A may be configured to form a single surface which traces a cycloid curve having a gradually varying curvature. In this instance, a portion of the region B extending outwardly from the edge P5 of a groove 35 closest to the region A (among grooves 35 formed in each sloped surface 32) may be assumed to be the sloped surface 32, and a remaining portion of the region B and the region C which extends from the edge P5 to a connecting end P2 connected to the flat magnetic pattern writing surface 31 may be assumed to be the connecting surface 33.

The magnetic pattern writing surface 31 and each of the sloped surfaces 32 are smoothly connected by the corresponding connecting surface 33. To this end, each connecting surface 33 in this embodiment is shaped like a portion of a circular cylinder having the radius R2 that is smaller than the radius R1. That is, each connecting surface 33 is configured to bulge out toward the magnetic tape MT', MT to be transported, and connected to the magnetic pattern writing surface 31 so that the plane containing the magnetic pattern writing surface 31 is tangent to the connecting surface 33. The magnetic tape MT', MT is arranged to slidably contact with the sloped surfaces 32, connecting surfaces 33 and magnetic pattern writing surface 31 (these surfaces of three kinds as connected together will hereinafter be referred to as "sliding surface"). It is preferable that a wrap angle θ of each of the connecting surfaces 33 for the magnetic tape MT', MT falls within a range not smaller than 1.16 degree and smaller than 90 degrees. If the wrap angle θ is smaller than the above range, the connected portion between the magnetic pattern writing surface 31 and the sloped surface 32 would become too sharp, and thus the magnetic tape M', MT having passed through that sharp connected portion would become unable to slide in contact with the sliding surface; that is, the spacing would become too great. The wrap angle θ smaller than 90 degrees contributes to improvement of the spacing.

The wrap angle θ of each connecting surface 33 for the magnetic tape MT', MT is an angle formed by two radii of a sectorial figure (as shown in FIG. 2) obtained from an approximated cylindrically curved surface (a portion of a circular cylinder around which the magnetic tape MT', MT is wrapped) connecting a line (indicated by P1 in FIG. 2) at which an imaginary extension plane F1 of the sloped surface 32 adjacent to the connecting surface 33 starts deviating from the sliding surface of the servo write head 30 and a line (indicated by P2 in FIG. 2) at which an imaginary extension plane F2 of the magnetic pattern writing surface 31 starts deviating from the sliding surface of the servo write head 30. The magnetic tape MT', MT changes its direction of transport by the degree θ (wrap angle) while it is transported from the position P1 to the position P2 (or from the position P2 to the position P1). It is understood that the center O of curvature of the approximated cylindrically curved surface may be given by a point of intersection of a perpendicular bisector of a line segment P1-P2 and a line extending perpendicular to the magnetic pattern writing surface 31 from the point P2 in FIG. 2. Accordingly, in order to determine a wrap angle θ, the shape of the servo write head 30 may be captured by a contact or non-contact shape measuring instrument or photographed, and magnified and traced into a two-dimensional figure, which in turn is used to make a drawing as described above.

If the sloped surfaces 32 are designed to have a shape, in side view, of neither of a straight line, a circular arc or a cycloid curve, and have irregularities or the like which make it difficult to define the imaginary extension plane F1, the sloped surfaces 32 may be approximated in a spline curve such as a three-dimensional spline curve, so that an extension line (plane) of such a spline curve can be used to define an imaginary extension line corresponding to the imaginary extension plane F1.

In each of the sloped surfaces 32, four grooves 35 each extending in a direction transverse to the magnetic tape transport direction are formed. The grooves 35 are provided for the purpose of discharging therethrough air entrained by the running magnetic tape MT', MT and intruded between each sloped surface 35 and the magnetic tape MT', MT, to diminish the spacing. To this end, the longitudinal direction of each groove 35 may preferably be perpendicular to the magnetic tape transport direction, but may be slightly angled from the direction perpendicular to the magnetic tape transport direction. The number of the grooves 35 provided in each sloped surface 32 may be determined as desired; i.e., one groove 35 may suffice for its intended purpose, or more than four grooves 35 may be appropriate as the case maybe. In order to reduce the spacing between the servo write head 30 and the magnetic tape MT', MT during the high-speed transport of the magnetic tape MT', MT, it may be preferable that the sloped surfaces 32 have at least one groove 35 provided therein. It is to be understood that one or more grooves similar to the grooves 35 may be provided in the flat magnetic pattern writing surface 31.

On the sliding surface formed at an underside of the servo write head 30, no coating layer is provided. In general, the magnetic tape sliding surface of the servo write head 30 may have a coating of diamond-like carbon (DLC) for protection or other purposes, but in view of the object sought in this embodiment, it should be preferable that such a coating layer is not provided in order to ensure that the magnetic tape MT', MT be kept in intimate contact with the sliding surface of the servo write head 30 so that a servo signal having a sufficient intensity can be written on the magnetic tape MT'.

When a servo write head 30 having a shape as described above is manufactured, edges of a thin-film magnetic head shaped like a plate (having a rectangular cross section) may be processed by mechanical polishing so as to form the sloped surfaces 32 and the connecting surfaces 33.

In order to form the sloped surfaces 32 and the connecting surfaces 33, besides the method of mechanically polishing the edges of a completely fabricated thin-film head having a rectangular cross section, a method of mechanically polishing edges of a base of the head (i.e., a core) which has not yet had films (e.g., a non-magnetic film to form a magnetic gap or magnetic films to be formed therearound) formed thereon may be applied. In the latter method, after the edges of the core are rounded to have surfaces corresponding to the sloped surfaces 32 and the connecting surfaces 33, thin films are formed thereon and the thin films may optionally be further processed to put a desired finish of the sloped surfaces 32 and the connecting surfaces 33 thereon.

In describing the present embodiment, the servo write head 30 is illustrated by way of example as in FIG. 3 to have its magnetic pattern writing surface 31 oriented downward, but the servo write head 30 may have a magnetic pattern writing surface 31 oriented in any direction. For example, the magnetic pattern writing surface 31 may be oriented upward, in which case the underside of the servo write head 30 is to be referred to as "upper surface" or the like.

Although not illustrated in FIG. 1, the servo writer 1 may include various components other than shown in FIG. 1, an additional tensioner, a servo signal verification device, etc., where appropriate.

When a magnetic tape MT with a servo signal written thereon is manufactured using the servo write head 30 configured as described above and the servo writer 1 including the same, a magnetic tape MT', MT is transported at high speeds to cause the magnetic tape MT' having no servo signal written thereon to slide along the magnetic pattern writing surface 31 of the servo write head 30, and a pulse signal for writing a servo signal on the magnetic tape MT' is outputted to the servo write head 30 using the write signal generator circuit 40. Accordingly, a leakage flux is generated from the magnetic gap 39 of the servo write head 30, and effects a change in the magnetic moment in the magnetic recording layer of the magnetic tape MT' so that a servo signal in the form of a servo pattern can be written on the magnetic recording layer of the magnetic tape MT'. The magnetic tape MT with the servo signal written thereon is taken up onto the take-up reel 22.

In this process of writing a servo signal on a magnetic tape as a step of a method for manufacturing a magnetic tape having a servo signal written thereon, the magnetic tape MT', MT is changed in its shape (running course) to closely follow the undersurface of the servo write head 30 with a moderate spacing while being transported, because the servo write head 30 in this embodiment has sloped surfaces 32 smoothly connected by the connecting surfaces 33 to the magnetic pattern writing surface 31 for effecting a magnetic change. Therefore, the spacing can be optimized and a sufficiently intense servo signal can be written on the magnetic tape MT'.

In particular, the servo write head 30 in the present embodiment has the grooves 35 formed in each sloped surface 32, and thus air between the magnetic tape MT', MT and the sloped surface 32 can be easily released out therethrough, so that the spacing between the magnetic pattern writing surface 31 and the magnetic tape MT', MT becomes moderate and adequate.

Although the exemplary embodiment of the present invention has been described above, the present invention is not limited to this embodiment, and may be carried out into practice in various other ways. Thus, it is contemplated that various modifications and changes may be made to the exemplary embodiment of the invention without departing from the scope of the embodiment of the present invention as defined in the appended claims.

For example, the angle of the sloped surface 32 with respect to the magnetic pattern writing surface 31 is not limited to that illustrated in FIG. 2. Furthermore, other surfaces which may be sloped at an angle different from that of the sloped surface 32 with respect to the magnetic pattern writing surface 31 may be provided outside the sloped surfaces 32 along the magnetic tape transport direction.

Next, the results of simulation of magnetic tape transport carried out to show advantageous effects of some embodiments of the present invention will be described below. The simulation was conducted using a software program called TapeLab2 (MicroPhysics, Inc.). The shape of the servo write head and the other conditions for calculation were as follows:

The entire width of the servo write head in FIG. 2: 3 mm
R1: 17.2 mm
The number of grooves: 8
The width of the grooves: 100 micrometers
The pitch of the grooves: 100 micrometers
The distance between the grooves closest to the connecting surfaces: 1 mm The wrap angle θ of the connecting surface was varied among four angles ranging from 1.16 degree to 1.40 degree. A magnetic tape was transported at magnetic tape transport speeds of 4, 6, 8, 12 and 16 m/s, and the distances between the magnetic gap and the magnetic tape being transported were calculated as in TABLE 1.

TABLE 1

Variations of spacing (nm) according to the wrap angles

| | | Magnetic Tape Transport Speed | | | | |
|---|---|---|---|---|---|---|
| θ (degrees) | R2 (mm) | 4 (m/s) | 6 (m/s) | 8 (m/s) | 12 (m/s) | 16 (m/s) |
| 0 | — | 270 | 300 | 400 | 600 | 800 |
| 1.16 | 1.97 | 98 | 102 | 105 | 105 | 112 |
| 1.18 | 2.91 | 84 | 85 | 86 | 86 | 88 |
| 1.23 | 5.58 | 84 | 83 | 85 | 87 | 86 |
| 1.40 | 13.11 | 85 | 85 | 84 | 85 | 85 |

As shown in TABLE 1, without a connecting surface provided between each sloped surface and the magnetic pattern writing surface, where θ=0 degree, i.e., an edge existed at the connecting portion between each sloped surface and the magnetic pattern writing surface, 270 nm of the spacing was generated even when the magnetic tape was transported at the speed of 4 m/s, and the spacing drastically increased according to the increase in the magnetic tape transport speed. On the other hand, with the connecting surfaces provided according to the embodiments of the present invention, where the wrap angle θ=1.16 degree, 1.18 degree, 1.23 degree, and 1.40 degree, the increases in the spacing according to the increase in the magnetic tape transport speed were very small, and a tendency was observed such that the spacing was generally reduced according to the increase in the wrap angle θ. In this way, it was shown that if the sloped surfaces were smoothly connected to the magnetic pattern writing surface by the connecting surfaces, the spacing would be unlikely to increase even when the magnetic tape transport speed was increased. It was confirmed that the results of analysis were not affected by the rigidity or other properties of the magnetic tape even when the currently commercially available magnetic tape and expected future products were taken into consideration.

What is claimed is:

1. A servo write head for writing a servo pattern on a magnetic tape, comprising:
   a flat magnetic pattern writing surface having a magnetic gap contoured to correspond to the servo pattern;
   sloped surfaces disposed upstream and downstream of the magnetic pattern writing surface in a magnetic tape transport direction at positions retreated from a position of the magnetic pattern writing surface, the sloped surfaces extending obliquely relative to the magnetic pattern writing surface; and
   connecting surfaces disposed between the magnetic pattern writing surface and each of the sloped surfaces, the connecting surfaces being curved gently to smoothly connect the sloped surfaces to the magnetic pattern writing surface, such that the connecting surfaces extend in a position retreating from the position of the magnetic pattern writing surface, wherein each of the connecting surfaces has a curvature greater than a curvature, equal to or greater than zero, of a corresponding sloped surface.

2. The servo write head according to claim 1, wherein the connecting surfaces are configured to bulge out toward the magnetic tape to be transported, to smoothly connect the sloped surfaces to the magnetic pattern writing surface.

3. The servo write head according to claim 1, wherein a wrap angle of each of the connecting surfaces for the magnetic tape is not smaller than 1.16 degree and smaller than 90 degrees.

4. The servo write head according to claim 1, wherein the sloped surfaces have at least one groove extending in a direction transverse to the magnetic tape transport direction.

5. The servo write head according to claim 1, wherein at least one of the sloped surfaces is shaped like a portion of a circular cylinder.

6. The servo write head according to claim 1, wherein at least one of the connecting surfaces is shaped like a portion of a circular cylinder.

7. The servo write head according to claim 6, wherein the plane containing the magnetic pattern writing surface is tangent to the at least one of the connecting surfaces.

8. The servo write head according to claim 1, wherein at least one of the sloped surfaces is curved to trace a cycloid curve.

9. The servo write head according to claim 1, wherein at least one of the sloped surfaces and a connecting surface adjacent thereto are connected to form a single surface configured to trace a cycloid curve.

10. The servo write head according to claim 1, wherein the magnetic pattern writing surface has at least one groove extending in a direction transverse to the magnetic tape transport direction.

11. A servo writer comprising:
    a servo write head according to claim 1;
    a magnetic tape transport system configured to supply a magnetic tape from a supply reel, cause the magnetic tape to slide along the magnetic pattern writing surface of the servo write head, and take up the magnetic tape onto a take-up reel; and
    a write signal generator configured to output a signal to the servo write head to write a servo signal on the magnetic tape.

12. A method for manufacturing a magnetic tape with a servo signal written thereon, comprising:
    transporting a magnetic tape to cause the magnetic tape to slide along the magnetic pattern writing surface of a servo write head according to claim 1; and
    outputting a signal for writing a servo signal on the magnetic tape to the servo write head, to thereby cause the servo write head to write the servo signal on the magnetic tape being transported.

* * * * *